United States Patent
Piemonte

(10) Patent No.: US 11,069,091 B2
(45) Date of Patent: Jul. 20, 2021

(54) SYSTEMS AND METHODS FOR PRESENTATION OF AND INTERACTION WITH IMMERSIVE CONTENT

(71) Applicant: Patrick S. Piemonte, San Francisco, CA (US)

(72) Inventor: Patrick S. Piemonte, San Francisco, CA (US)

( * ) Notice: Subject to any disclaimer, the term of this patent is extended or adjusted under 35 U.S.C. 154(b) by 0 days.

(21) Appl. No.: 16/544,563

(22) Filed: Aug. 19, 2019

(65) Prior Publication Data

US 2021/0056733 A1 Feb. 25, 2021

(51) Int. Cl.
*G06T 11/00* (2006.01)

(52) U.S. Cl.
CPC .......... *G06T 11/00* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 2010/0299630 A1* | 11/2010 | McCutchen | ........ | G06F 16/7844 715/803 |
| 2012/0287165 A1* | 11/2012 | Yamada | ................ | G06F 3/0483 345/672 |
| 2018/0293771 A1 | 10/2018 | Piemonte et al. | | |
| 2019/0034441 A1* | 1/2019 | Capon | .................... | G06F 16/958 |
| 2019/0166446 A1* | 5/2019 | Eronen | .................... | G06F 3/167 |
| 2019/0188893 A1 | 6/2019 | McTernan et al. | | |
| 2019/0206140 A1 | 7/2019 | Chen et al. | | |
| 2019/0251750 A1 | 8/2019 | Brewer et al. | | |
| 2020/0257245 A1* | 8/2020 | Linville | .................. | G06T 7/593 |

OTHER PUBLICATIONS

Paes et al., "The Relevance of Visual Cues in Immersive Environments: Does Pictorial Realism Matter?" Computing in Civil Engineering 2019.

* cited by examiner

*Primary Examiner* — Yi Wang
(74) *Attorney, Agent, or Firm* — Ryan Alley IP

(57) ABSTRACT

Communications devices and methods perform spatial, visual content and a separate preview of other content apart from the performed content. Content may include 3-D performances or AR content. Immersive visual content may be received by the communications device and simplified into transcript cells and/or performed render nodes based on metadata, visual attributes, and/or capabilities of the communications device for performance. Render nodes may preview other content, which is performable and selectable with ease from the communications device. Devices may perform both a piece of content and display, in context, render nodes for other visual content, as well as buffer and prepare unseen other content such that a user may seamlessly preview, select, and perform other visual content. Example GUIs may arrange nodes at a distance or arrayed long a selection line in the same coordinates as performed visual content. Users may input commands to move between or modify the nodes.

16 Claims, 7 Drawing Sheets

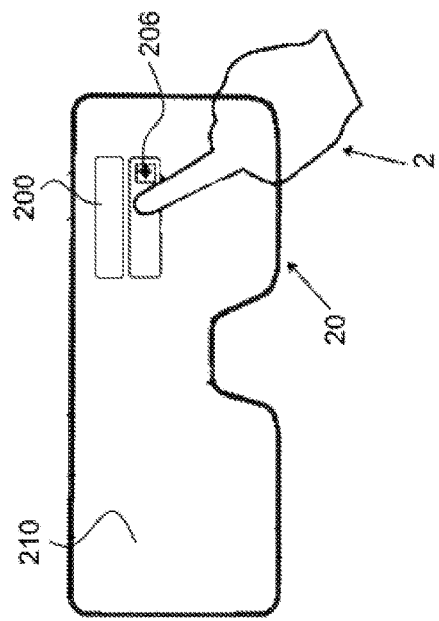
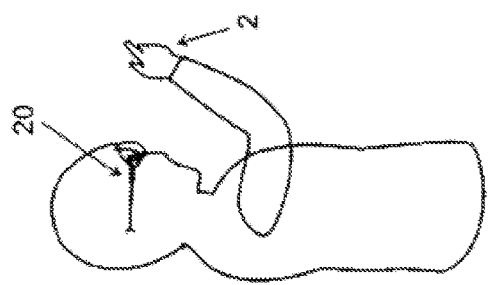
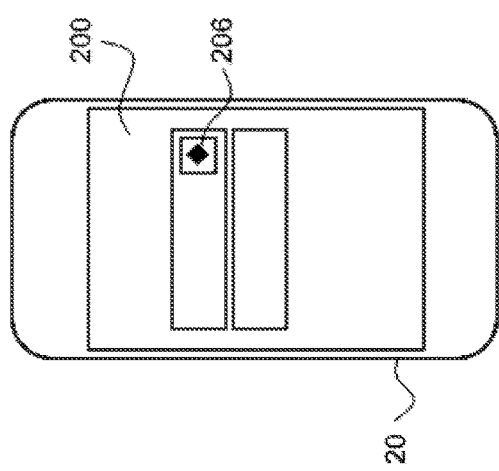
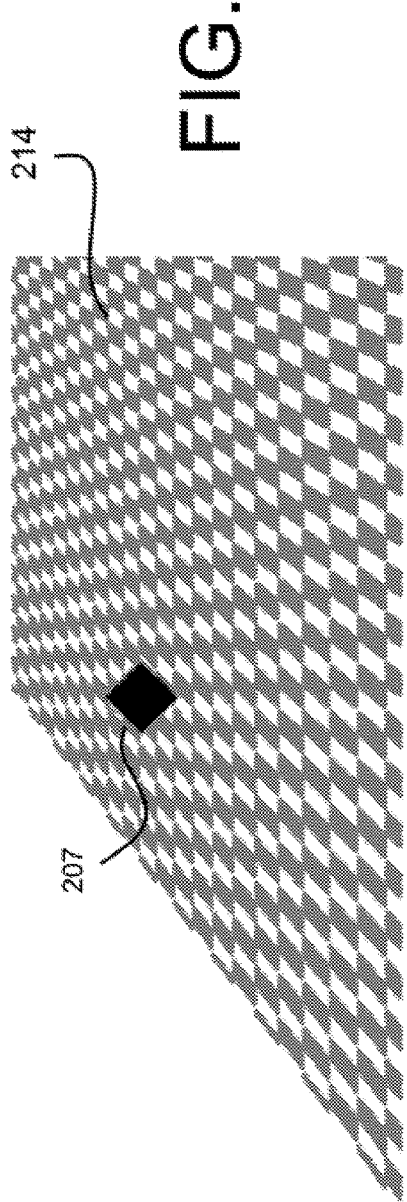
FIG. 5A
FIG. 5B
FIG. 5C

SYSTEMS AND METHODS FOR PRESENTATION OF AND INTERACTION WITH IMMERSIVE CONTENT

BACKGROUND

Displays, including screens on mobile devices, may be used to perform or identify 3-D or augmented reality (AR) through a 2-D application. These applications may use a simplified identifier or overlay of graphical/added subject matter on live or recorded video or still images. In these systems, a user or application select from available 3-D or AR performance through a unified list displayed onscreen for by scrolling through a list of icons or other symbols that represent, in a simplified manner, the available experiences. For example, a compatible scene or a human face may be recognized in a video feed or image still, and the application may present a scrollable list of filters or selectable icons that represent all available AR or 3-D experiences for the scene or face. The appropriate or desired experience may then be selected, such as through a user tap on the screen, for performance.

Available 3-D or AR experiences maybe saves server-side and loaded on demand at clients, such as mobile devices, or stored device-side after an initial download or update of an application. Because transfer of the 3-D or AR performance must occur at some point, they are typically stored as a unified, simple list, potentially varied based on user characteristics or location. For example, 3-D content may be requested and/or provided as a chronological list associated to a user, location, and/or specific characteristics of a location or physical item. While this content may be stored server-side and/or in various databases, it is coalesced in the request. The visual data and identifying information for the same is then typically presented without variation or regard for type of performance, type of visual data, or other user characteristics.

SUMMARY

Example embodiments and methods include communications devices and associated hardware, software, and networks that allow performance of immersive content while seamlessly previewing or moving between other content. This immersive content may include 3-D performances or AR content in surrounding environs. Immersive visual content may be received by the communications device and consist of hundreds if not more pieces of individual performable content. These pieces may be processed for metadata, based on visual attributes, and based on capabilities of the communications device to form one or more render nodes. Each node acts as a preview of the content from which it is drawn, and are performable and selectable with ease from the communications device. The device may perform both a piece of the immersive visual content and display, in context, render nodes for other visual content, such that a user may seamlessly preview, select, and perform the other visual content. For example, the render nodes may be previewed as sequential frames placed at a distance or arrayed long a selection line in the same coordinates as performed visual content, and a user may gesture, tap, or otherwise input commands to move between the nodes while still immersively viewing current content.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

FIG. 5A and FIG. 5B are illustrations of example embodiment graphical user interfaces for selecting immersive content. FIG. 5C is an illustration of an example embodiment graphical

DETAILED DESCRIPTION

Figure 1:
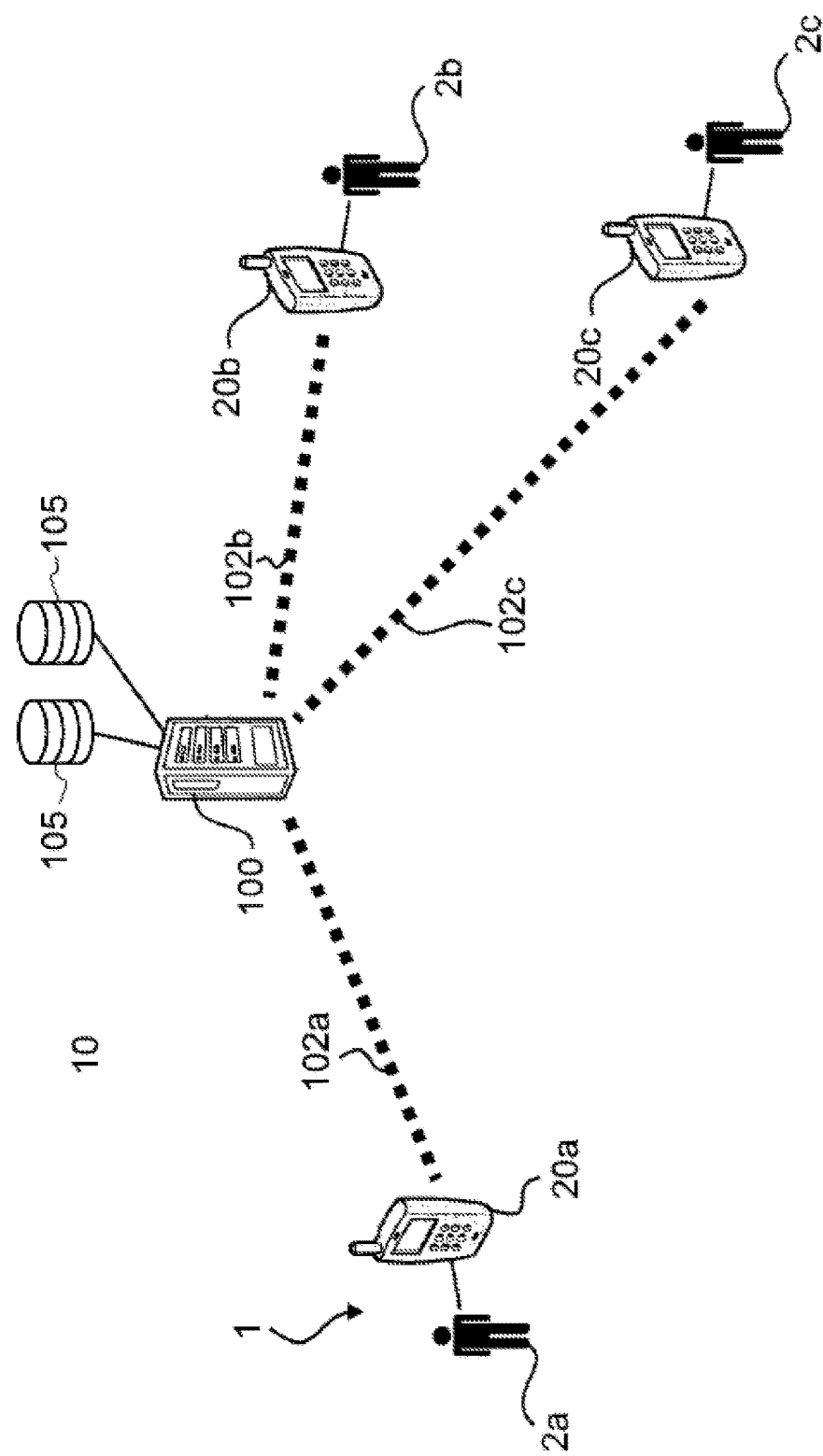
FIG. 1 is an illustration of an example embodiment network for sharing and/or performing immersive content.

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the terms first, second, etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from single operations described below. It should be presumed that any embodiment or method having features and functionality described below, in any workable combination, falls within the scope of example embodiments.

The inventor has recognized that spatial and 3-D visual content, including augmented reality (AR), will become more widespread with increased network availability and bandwidth, coupled with the increase in social media and other platforms offering immersive visual content creation, sharing, and performance. Navigating among larger and larger amounts of this visual content with communications devices like a mobile smartphone or 3-D headset may become increasingly difficult due to the inability to simultaneously present all display options at once because of overlap or conflict in level of detain among available content as well as varying user equipment and locations. Especially as AR becomes more commonplace in commerce and e-commerce, consumers may need to select among several options for purchase that must be presented together. In these instances, individual pieces of this visual content will have to be downloaded and performed, with extensive breaking between available immersive experiences. Other available pieces of immersive visual content may be difficult to identify and browse during this performance, so a user may have to stop any current performance to return to a menu or list for such browsing. Moreover, because 3-D and AR content often has additional actions available with its performance beyond merely viewing, including repositioning elements, activating underlying functions, linking, sounds, etc., these additional actions are often not available or perceivable when selecting among visual content. Rather, again, a user must download and perform the entire piece to perceive these related actions without being able to browse other pieces with actionable content. Description of the status of immersive content is detailed in Paes et al., "The Relevance of Visual Cues in Immersive Environments: Does Pictorial Realism Matter?" Computing in Civil Engineering 2019, incorporated by reference herein in its entirety, from which these problems are only now identified.

The inventor has further recognized that user communications devices will often vary in capacity and performance integrity and may include displays varying from 2-D touchscreens up to multiple 3-D projectors. With multiple different pieces of spatial and 3-D content available, much of which is dependent on surrounding spatial characteristics and device location, users may have inconsistent browsing experiences, and available immersive content may not be properly identified, edited, or performed on some types of devices. As 3-D, AR, and other spatially-dependent media become more prevalent in creative spaces, users will need to be able to browse such content outside a 2-D static interface or list that does not properly convey the nature of the media, especially when being initially compared and selected among several other pieces of available media. The inventor has developed example embodiments and methods described below to address these and other problems recognized by the inventor with unique solutions enabled by example embodiments.

The present invention is devices, software as stored or executed on tangible computer-readable media, and methods for presenting and selecting among several distinct pieces of immersive visual information. In contrast to the present invention, the few example embodiments and example methods discussed below illustrate just a subset of the variety of different configurations that can be used as and/or in connection with the present invention.

As used herein, "communications device(s)"—including user communications devices 20(a, b, c) of FIG. 1—is defined as processor-based electronic device(s) configured to receive, transmit, create, and/or perform immersive content, which includes spatial visual content like three-dimensional (3-D) or augmented reality (AR) content. Communications devices include mobile devices like smartphones and wearables such as head-mounted displays and stationary devices like desktop computers and projectors. Information exchange and communicative connection between communications devices themselves and other computers must at some point include non-human communications, such as digital information transfer between computers.

FIG. 1 is an illustration of an example embodiment network 10 useable to create and share immersive visual content, including AR and 3-D experiences, among and to multiple users. As shown in FIG. 1, network 10 provides communicative connection among several different users 2. Users 2 may be operators of communications devices 20 operating in network 10. First user 2a with communications device 20a may be at a first position or environment 1 where 3-D content may be displayed or with media to be augmented. Second user 2b and third user 2c may be elsewhere at that moment or co-located with communications devices 20b and 20c, respectively. Through interface with application host 100, communications devices 20a, 20b, and 20c may be capable of jointly contributing to, creating, and/or performing 3-D content and/or augmented reality in underlying environment 1, even though not necessarily all present in environment 1.

The visual data may be stored at any location, even during active editing, where it may be resident in transient memory before being stored in permanent memory. For example, all devices 20a, 20b, and 20c may perform and/or edit augmented reality data or 3-D information resident on host 100; alternatively, the content may be resident on device 20a and edited there, with later transfer for performance on devices 20b and 20c. Example embodiment network 10 may be configured as in US Pat Pub 2018/0293771, published Oct. 11, 2018 and incorporated herein by reference in its entirety. For example, devices 20b and 20a may connect to application host 100 through any number of intermediary networks. Similarly, devices 20b and 20a may connect without application host 100 by forming their own shared sockets 102b and 102a for directly connecting and sharing 3-D performances and/or augmented reality. In the instance of a direct connection, application host 100 may simply provide downloadable software and configure devices 20a and 20b to enable them to make such a connection independently.

Figure 2:
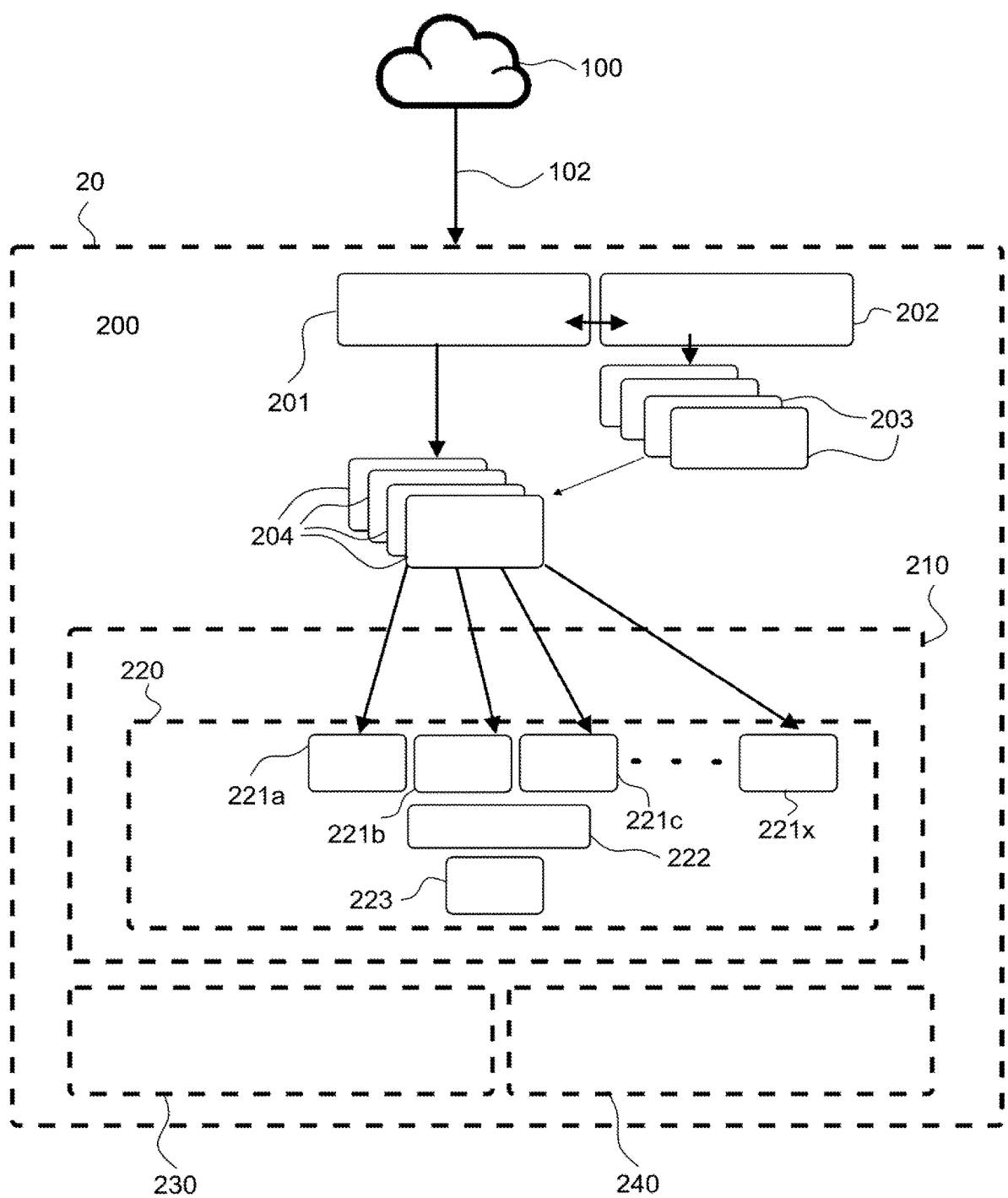
FIG. 2 is a schematic of a data flow in an example method of displaying immersive content on a communications device.

FIG. 2 is a schematic illustrating an example method of data handling in an example embodiment communications device 20. Communications device 20 may be configured via hardware and/or software to communicate with and connect to the example network of FIG. 1. As shown in FIG. 2, communications device 20 receives several distinct pieces of immersive visual information from a source 100, including application servers, third-party applications, and/or other users. The visual information may include 3-D visual display information and/or AR content. For example, source 100 may include dedicated visual content or airspace servers that house and transmit large amounts of AR and/or 3-D display information for end user performance in an on-demand or streamed manner. The display information may be transmitted over a particular socket 102 based on user identity, authentication, data type, etc. The visual information may also include preview information or metadata that may describe or summarize the displayed or performed content therein.

Communications device 20 then prepares the received information for browsing and selection by a user. For example, communications device 20 may prepare complex AR or 3-D information, potentially from several different sources and users and with conflicting visual characteristics, for easy browsing and selection on a 2-D screen or in a simplified 3-D sketch through 2-D interface 200. As shown in FIG. 2, transcripting services, such as transcript controller 201 and transcript flow layout 202, may be used to generate transcript cells 204 that are tailored to the user based on the nature of the received visual data and/or the user's characteristics including surrounding spaces, device capacity, connection bandwidth, visual information size, user location, etc. For example, transcript controller 201 may analyze and extract a subset of AR objects or 3-D scene characteristics such as size, depth, etc. Controller 201 may further extract and/or create metadata for the presentation elements. Such metadata may be directly stored in a node in the scene graph, such as in a dedicated field or as a part of a file format such as in a file extension. Similarly, metadata may be available through http API requests that map it to specific nodes.

Flow layout 202 may then adjust the received visual information based on the visual display properties of device 20. For example, device 20 may have a limited range of motion or be capable of displaying only 2-D images or a limited set of AR elements, and flow layout 202 may simplify the visual information to identify the received information on device 20 based on its characteristics. Similarly, flow layout 202 may use metadata created or extracted by controller 201 and format the visual data based on the metadata. For example, the metadata may indicate a particular frame or image that should be used from 3-D visual data in the instance that less than full 3-D visual data can be displayed by device 20. Metadata may permit a variety of different interactions and performances. For example, a key-value pair in the metadata may correspond to transcript cell 204 and/or node 221 (discussed below) that is specifically actionable when user selected, or actionable with other nodes when loaded, or describes how another system should interpret the content when loaded from the network, or index it when sent to the server.

Transcript cells 204 contain the reduced visual information for customized display on device 20 through 2-D interface 200. Several transcript cells 204 may be created, potentially each for different users, types of received visual data, distinct performances, etc. For example a particular space containing device 20 may have several different AR performances available for display in the space, or a user may be connected to a data stream including 3-D data from several different connections. Transcript cells 204 may be divided on these bases, potentially by transcript flow layout 202 and/or transcript controller 201. Because transcript cells 204 may be relatively simplified based on display capabilities and visual data type, several cells 204 may be loaded into and manipulated into memory at once, and they may be serially browsed, even while another piece of immersive content is being performed. For example, a user may browse, edit, import, delete, or select for performance a particular cell 204 being performed on 2-D interface 200, such as on a touchscreen menu or on a 2-D surface projected by an AR headset.

Scenegraph 220, potentially as a component of a 3-D interface 210 or other graphics program, may then render transcript cells 204, such as a cell(s) 204 selected by a user through 2-D interface 200 or cells 204 commanded by a program, as render nodes 221a, b, c, etc. on communications device 20. Although 3-D interface 210 and scenegraph 220 are shown as children of 2-D interface 200 on communications device 20 in the example of FIG. 2, it is understood that 2-D interface 200 and 3-D interface 210 may be separate displays and/or separate devices in communication.

Scenegraph 220 may perform nodes 221a, 221b, 221c, . . . 221x in several different graphical user interface styles, including those discussed in connection with FIGS. 5-7. Scenegraph 220 may readily display and switch between nodes 221a, b, c, etc. upon user input, potentially performing a number of transcript cells 204 that present visual information from different users, different types, etc. For example, node 221a may be for a first piece of AR available at a particular location, and 221b may be for a second piece of distinct AR available at that particular location, and a user may scroll, swipe, select, etc. among nodes 221a and 221b and thus the different ARs while any one of them are being previewed or fully performed. Similarly, a user may select different transcript cell 204 from 2-D interface 200 separately or simultaneously with performance of node 221a in scenegraph 220 to change to different node 221b corresponding to the different transcript cell.

Scenegraph 220 under control of controller 201 may arrange nodes 221a-x in a programmed order of transcript cells 204. For example, controller 201 may calculate a chronological order or other ordered subset of cells 204 in 2-D interface 200 for view, and this same order may be applied to nodes 221 during performance. When progressing through the content, nodes 221 may be paginated away and/or into view based on this ordering. Similarly, with a set order, nodes 221 may be buffered or pre-loaded without being performed, based on their anticipated display, such as when a corresponding cell 204 is approached in 2-D interface 200. Nodes 221 may all then be seamlessly ready for display and selection as a user quickly moves or browses through them.

Controller 210 may also preload and/or modify transcript cells 204 based on user input to either 2-D interface 200 loading the same and/or scenegraph 220 performing nodes 221. For a currently-performed node 221a, a user may input different performance parameters such as changing underlying media, changing display position, altering view size, changing node or cell order etc., and these changes may be applied to subsequent nodes 221b, etc. For example, the same transform from user input applied to a currently-performed node 221a may be copied to each sequential render node 221b, etc. in scenegraph 220 based on ordering in memory. The copy may be as simple as a constant value for display that is multiplied with the position or the transform of a node's position in relation to an overall scene's anchor point. Root node 222 and root replacement node 223 may store or persist default or original presentation data for render nodes 221. In this way, as transform calculations based on display and input changes are applied to each node, root node 222 may preserve original characteristics that are then transformed in descendent nodes 221 being displayed and ordered or saved as a new original in replacement node 223.

Nodes 221 may be performed in combination with input from vision system 230 and/or camera 240. For example, nodes 221 using 3-D displays may use a 3-D headset or projector in vision system 230, and nodes 221 using AR may use camera 240 to combine AR elements with underlying reality. 3-D renderer 210 may combine or correlate these elements as necessary for immersive content. Because nodes 221 as performed from transcript cells 204 may be relatively flexible and customized based on user characteristics and type of visual data received, users of device 20 may move readily among nodes 221 with better understanding of each node's visual appearance, instead of merely selecting from a list or waiting for an entirely-reproducible visual performance to be downloaded and rendered.

Figure 3:
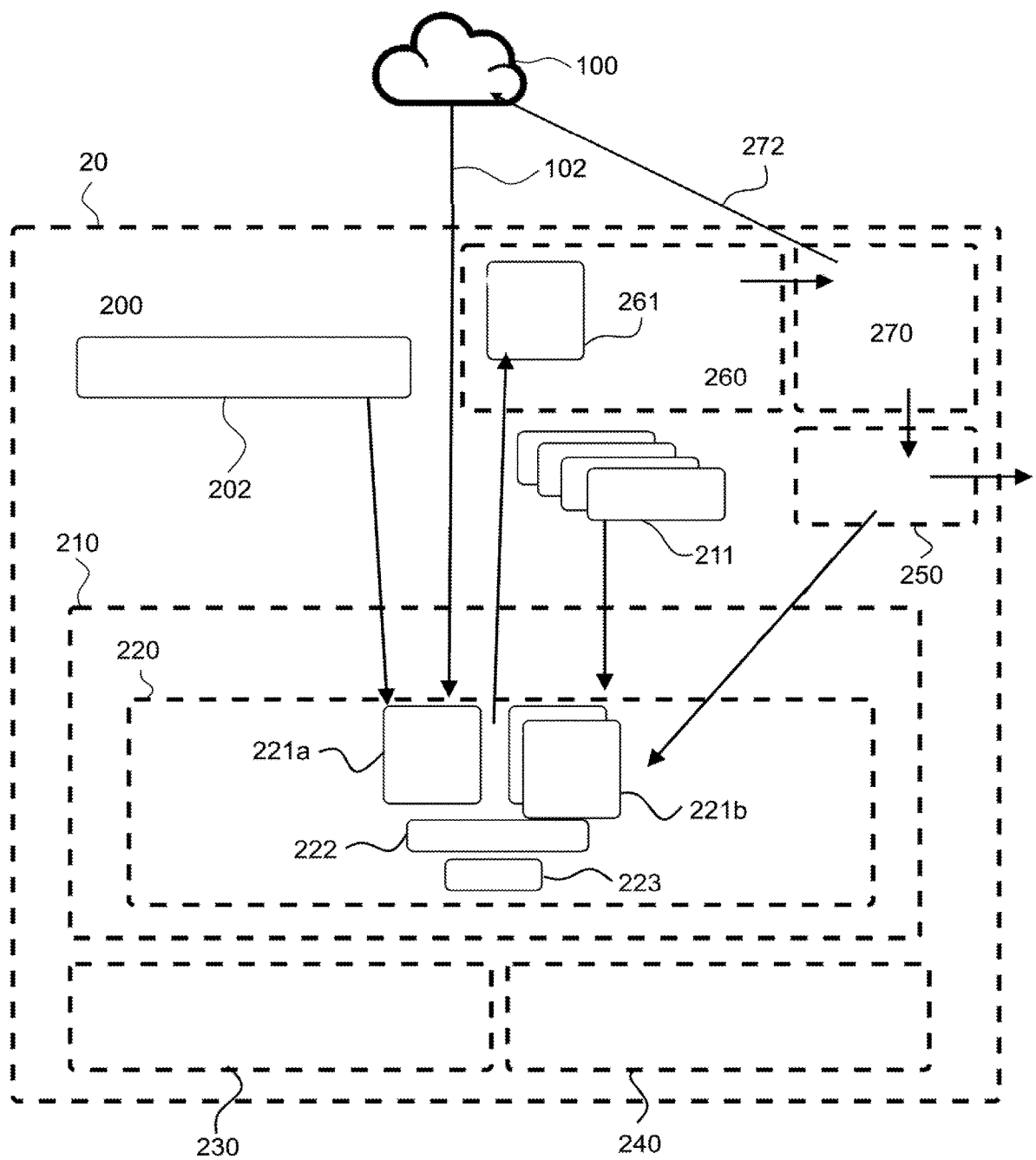
FIG. 3 is a schematic of a data flow in another example method of creating immersive content on a communications device.

FIG. 3 is a schematic illustrating data flows in another example embodiment communications device 20 for creating immersive content. As shown in FIG. 3, a particular node, 221a, may be selected for editing or creation by input system 220, which may recognize gestures as well as other selective input. For example, node 221a may be a particular piece of AR for an available underlying anchor or a 3-D presentation or filter for a display system, or node 221a may be blank, offering an open space for scene creation. The user may create desired visual scenes through creator tools 211, which may be substantially similar to those tools found in the incorporated '771 publication. Tools 211 may use imported or created visual content in creating or editing node 221a, including images or other visual content from system pasteboard 250.

Node 221a may be processed and formatted with metadata by scenegraph 220 and exporter 260 for direct input processing as in FIG. 2. For example, information about 3-D or AR geometry, type or category of visual content, such as a text, animation, AR image, location, or creating user social profile type, and device hardware requirements like materials, AR-compatibility, 3-D vision system, etc. may be appended as metadata to the node 221a otherwise including visual data for performance. In this format node 221a may be processed as a transcript cell for reproduction and display by scenegraph 220 in FIG. 2.

When a user has finished creating or editing node 221a, exporter 260 may receive and further process the visual data and metadata in the same. For example, node 221a may be identified, through metadata encoded by scenegraph 220 and/or tools 211, as a child or edited version 261 of another parent node 221b. Or, for example, node 221a may be identified or associated with an action trigger 261, such as a hashtag search or a link to a user's profile identified in the metadata associate therewith. Exporter 260 may thus filter out redundant or old nodes with updated versions 261 and load data associated with actions like linking or searching based on the type of the node.

All this metadata and visual data in the version 261 of the received node may then be handed to encoder 270 for export. For example, encoder 270 may compress the data for transmittal over an internet upload 272 or convert the data to a USDZ or GLTF format that can be used by system pasteboard 250 or saved in a local cache. In this way, the node can be reused and shared or performed with other users through the Internet, a network, service, or other connection to device 20. Similarly, updated version 261 may refer back to or be a hierarchical child of root node 222. In this way, 3D content may be added to a child descendant, so the user can undo or delete all additions or other changes in a new version 261 simply by removing all child from root node 222.

Figure 4:
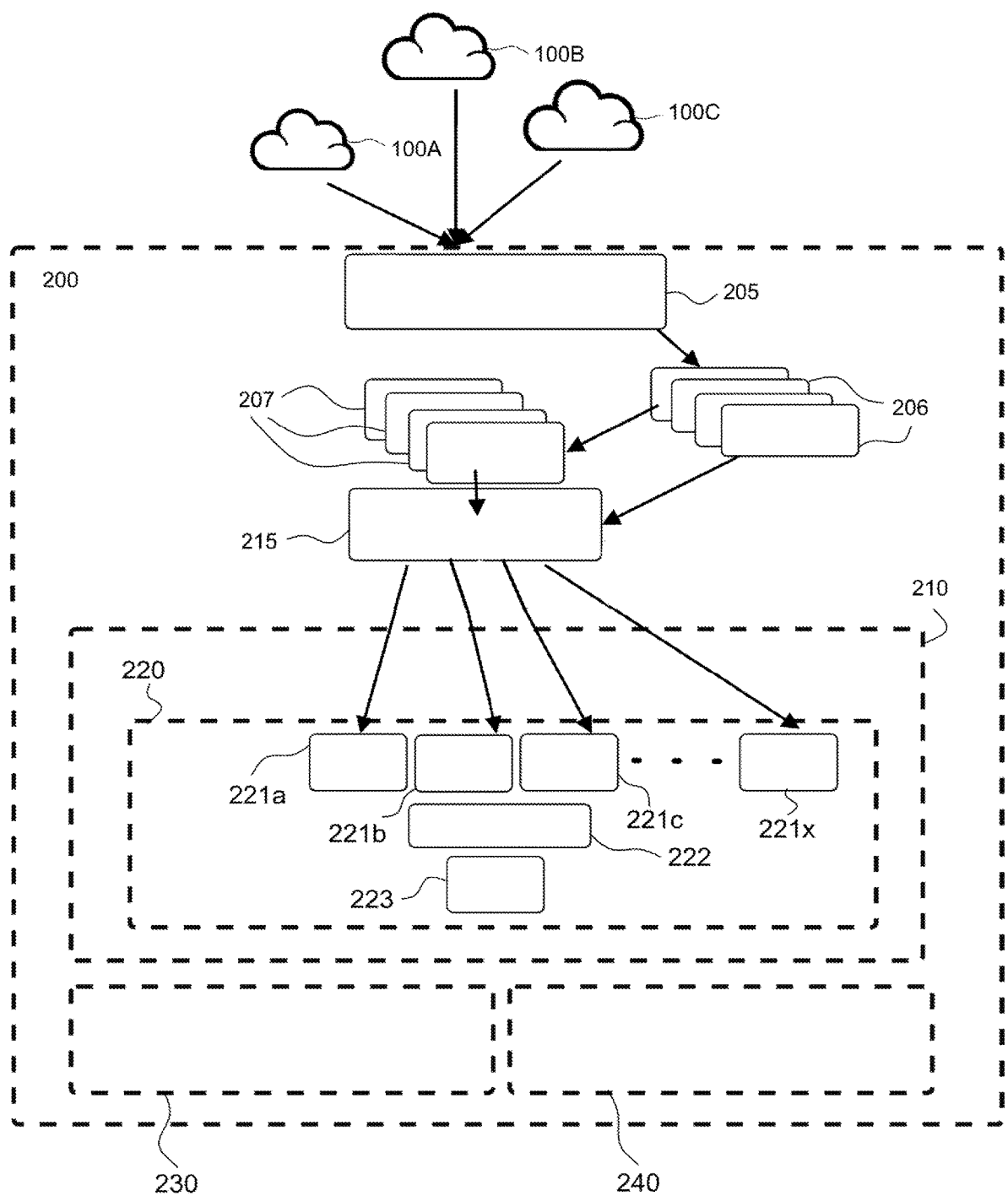
FIG. 4 is a schematic of a data flow in another example method of receiving immersive content on a communications device.

FIG. 4 is a schematic showing creation and/or handling of immersive visual content in an example embodiment communications device 20 connected to multiple different networks or services 100A, 100B, 100C, etc. As shown in FIG. 4, service adapter 205 may receive immersive media, including visual elements, performance instructions, and potentially metadata of the same from multiple different services 100A, 100B, and 100C, potentially in varying formats. Service adapter 205 may transcript the immersive content based on the device and metadata, such as through the functionality of elements 201-203 of FIG. 2. Service adapter 205 may prepare one or more tool controllers 206 in association with each piece of immersive content.

Each tool controller 206 may govern how each corresponding piece of content is displayed in 2D interface 200 as item model 207, as well as how the user may select, place, edit, or otherwise interact with the same, based on the underlying content type, display needs, subject matter, communications device parameter, or any other metadata. For example, tool controllers 206 may present as a 2-D scrollable menu briefly illustrating available content pieces for selection. Just as with transcript cells 204, tool controllers 206 may control how item models 207 are displayed and options associated therewith based on associated metadata created, transcripted from, or extracted from the immersive content. As discussed above, metadata may permit a variety of different interactions and performances. For example, a key-value pair in the metadata may correspond to node 221 or item model 207 that is specifically actionable when user selected, or actionable with other nodes when loaded, or describes how another system should interpret the content when loaded from the network, or index it when sent to the server.

Based on a selection or other input into tool controller(s) 206, item models 207 reflecting the available content as processed by service adapter 205 and tool controllers 206 may then be displayed on 2-D interface 200. For example, item models 207 may be representative images or descriptions that can be displayed in 2-D that correlate with the received and available 3-D content, each model 207 generated as determined by selection of a corresponding tool controller 206. Or for example, item models 207 may be 2-D icons or placeable markers that reflect 3-D content type, e.g., 3-D or AR, or compatibility, e.g., requiring an eligible surface, requiring a specific location, requiring a head-mounted display, etc.

Users may interact with, such as by browsing, moving, selecting, giving user input to, etc., item models 207. Interactions may be governed by a selected tool controller(s) 206. For example, some types of content, and associated item models 207, may be selected in combination, or moved about a 2-D space, as interactions. As a user may changes tool controller 206, such as by changing a display mode or object type, item model 207 may be reformatted to match. Once an item model 207 is selected for performance, scene loader 215 may convey the selection, as well as any input such as placement, text input, touch type, etc., to perform the associated immersive content in 3-D interface 210 and scene graph 220.

FIGS. 5A-C are an illustrations of example embodiment GUIs on various communications devices 20 for content selection. In FIG. 5A, for example, communications device 20 may be a smartphone with 2-D interface 200 being a touch screen. In FIG. 5B, for example, communications device 20 may be a wearable AR or 3-D headset with 3-D interface 210 being a projection field of the headset that can display as a field 2-D interface 200. As seen in FIGS. 5A and 5B, devices 20 can display 2-D selection fields with tool controllers 206 showcasing available media, such as in a pull-down menu or scrollable list. User 2 can interact with tool controller 206 to select a desired piece of media for full performance, while tool controller 206 gives an accurate representation of the available media based on its metadata. Tool controller 206 may also receive other user input from a user, such as filtering, multiple selection, credential input, etc.

As shown in FIG. 5C, once selected, item model 207 may be placed in field 214, such as a field of view or camera view, for placement, orientation, and/or other input prior to performance. For example, a user may find a desirable location and/or eligible surface in field 214, and item model 207 may reflect the type, content, or compatibility of the underlying immersive performance with the location or surface, based on its determined or received metadata. Upon successful placement of item model 207 in field 214 and/or another accepting input, the underlying immersive content, such as node 221, which could be, for example, an AR element positioned at the placement of item model 207, may be fully performed.

Figure 6:
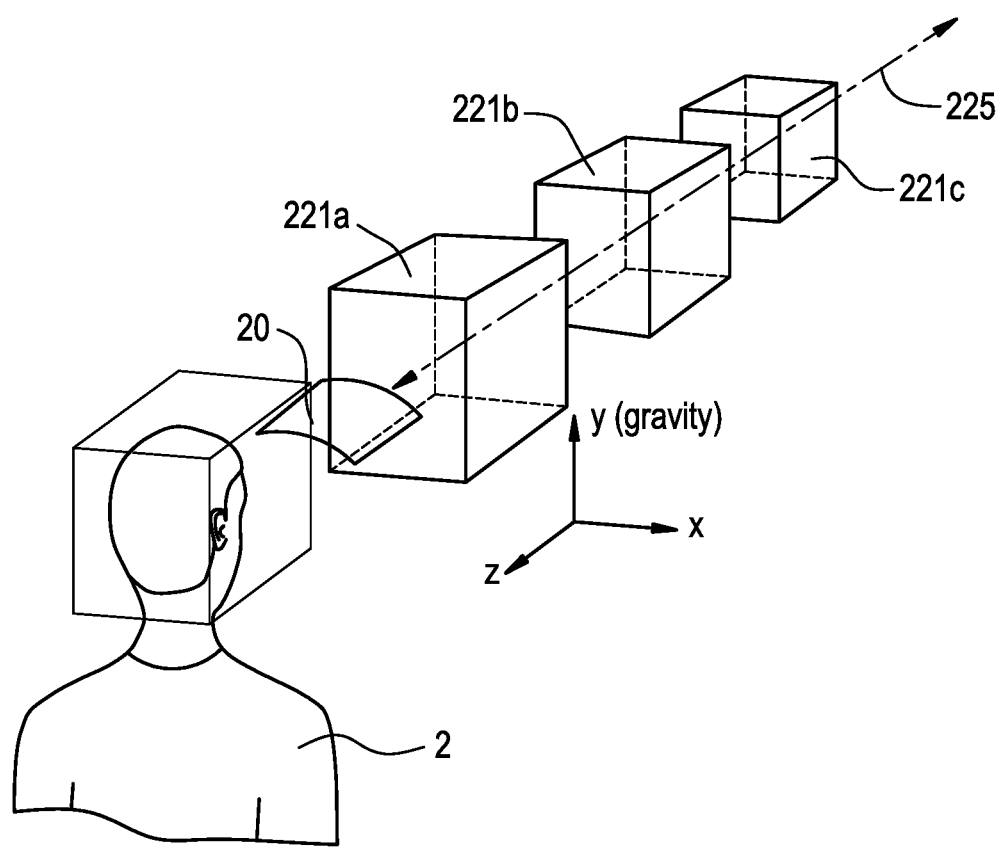
FIG. 6 is an illustration of an example embodiment graphical user interface for displaying immersive content.

FIG. 6 is an illustration of an example embodiment GUI useable to browse multiple render nodes through communications device 20. As mentioned, communications device 20 may include a 2-D screen with camera 240 or other display system 230 capable of displaying render nodes 221 in quick and accessible fashion. As shown in FIG. 6, user 2 may view and select from several render nodes 221a, 221b, 221c in a 3-dimensional manner, with each node being arrayed along selection line 225 and the user moving between the nodes with input. Each node 221 may be presented to user 2 in alignment with 3-D coordinates, x, y, z of both the space surrounding device 20 and render nodes 221, so that the real environment surrounding user 2 and their natural internal bearings match the orientation and gravity of nodes 221. User 2 may input a selection to move between performance of nodes 221a, 221b, 221c, etc. by moving device 20 along selection line 225, pinching or expanding on a touchscreen, double-tapping, entering a next input, gesturing, etc. through appropriate detectors in device 20. Similarly, user 2 may dismiss nodes being previewed by swiping or selecting a remove previews option, for example.

User 2 experiencing one render node 221a may thus still see, experience, and preview other available render nodes 221b, 221c, etc. that have been formatted not to interfere with the active render node 221a though example transcripting services discussed above. In this way, user 2 does not have to leave or stop performance of one node on a communications device to preview or switch to other available nodes. Rather, salient aspects of all other available render nodes can be previewed and selected all while another node is being actively performed.

Figure 7:
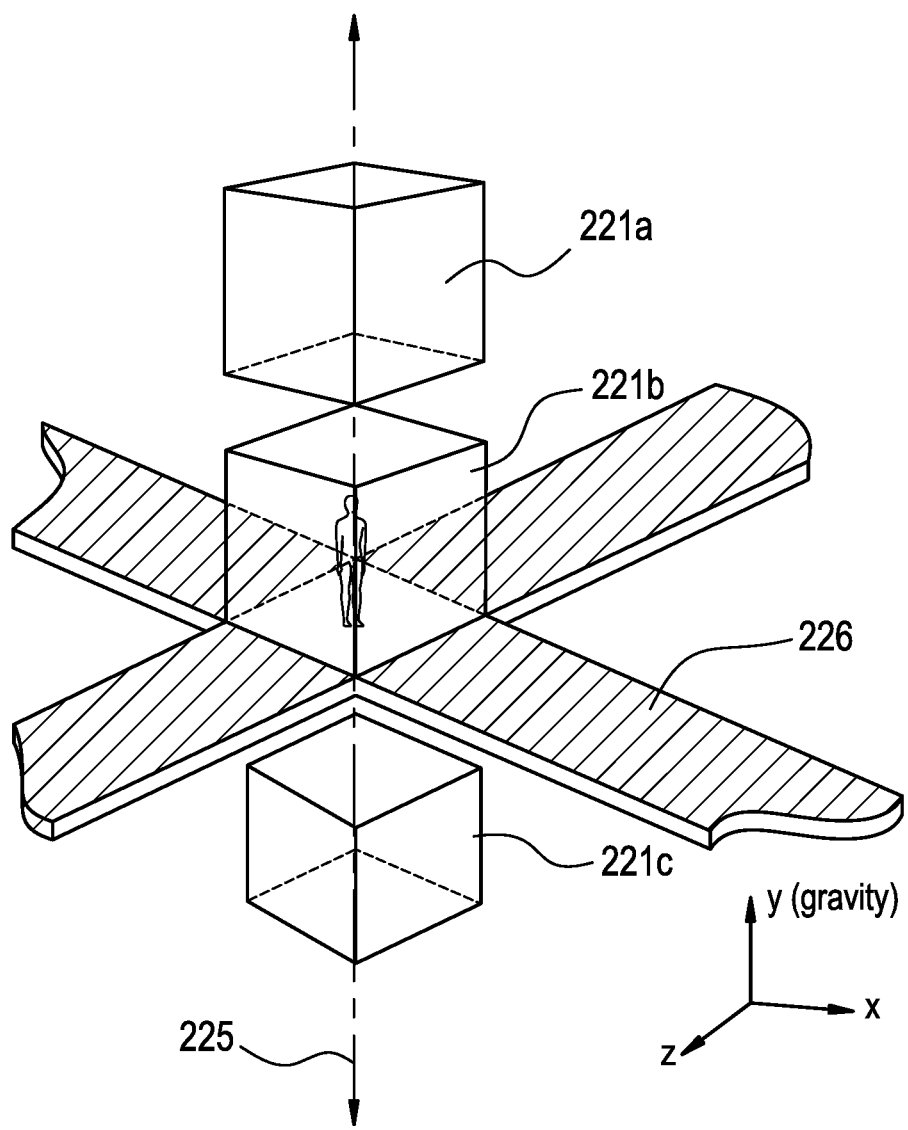
FIG. 7 is an illustration of another example embodiment graphical user interface for displaying immersive content.

FIG. 7 is an illustration of another example embodiment GUI useable to browse multiple render nodes through communications device 20. As shown in FIG. 6, node 221b may be performed in plane 226 where user 2 is standing, such as through a 3-D headset as device 20. User 2 may look up or down in the y direction with gravity to have adjacent nodes 221a or 221c along selection line 225 previewed and/or performed. Or, for example, user 2 may air point or tap with controllers that sense 3-D positioning to scroll between and preview other nodes, all while reader node 221b is being performed. Of course, other inputs my advance nodes 221 along selection line 225, such as tapping or shaking.

As discussed above, subsequent nodes 221b or later may not be displayed at all if there is insufficient room and/or distance until a user reaches such later nodes for presentation. These later nodes 221 b-z, etc. may be pre-loaded by a scenegraph or in a 2D interface cell with current input and transforms applied to the same such that they can be readily browsed to and presented either as preview or active nodes for performance without delay or further transformation before performance. In this way, multiple nodes 221 may be easily browsed in AR or 3-D in real space and in real-time about user 2 for a user to perceive and select a particular node for performance.

The GUIs of FIGS. 5-7 may be useable together to browse and orient render nodes quickly and responsively to user feedback. For example, as a user is moving between different nodes 221 of FIGS. 5-7, item model 207 of FIG. 5B may appear whenever a node is switched, to position and orient performance among detected or available surfaces captured by the communications device. Similarly, when moving between multiple nodes 221, multiple selection lines 225 may be used in multiple directions. For example, a vertical selection line 225 may include nodes from a single user arrayed along it, and a horizontal selection line may include nodes based on creation date arrayed along it, so a user may browse among several different node criteria through input in different directions.

Because nodes 221, and underlying item models 207 and transcript cells 203, may be specially processed and formatted based on their performance requirements, visual content, and/or communications device properties from metadata and/or analysis of incoming visual information, the communications device may flexibly and readily switch between and perform multiple render nodes 221 to allow optimum user experience, selection among, and manipulation of available AR or 3-D presentations. Example embodiment GUIs may permit zooming, rotation, translation, or other movement of nodes 221 and/or item models 207 through tactile input, including long-touching, tapping, pinching, spinning, dragging, etc. of finger(s) or stylus(es) across a touchscreen presenting the same, potentially in combination with the above-discussed node selection and performance.

Given the variety of example functions described herein, example embodiment devices may be structured in a variety of ways to provide desired functionality. Other divisions and/or omissions of structures and functionalities among any number of separate modules, processors, and/or servers are useable with example embodiment devices, including execution on a single machine or among distant, exclusive servers and processors. As discussed in the incorporated '157 application, actions throughout example methods may include user authentication, data verification, privacy controls, and/or content screening. For example, in example methods, users may never be provided with identifying information of the one another, such that a party creating augmented reality content and/or a party consuming the same may remain anonymous to the other. For example, data may be encrypted and not retained at one or all points in example methods, such that there may be no discoverable record of augmented reality, independent media, origin and/or limitation information in regard to such content, existence, performance, etc. Example methods may take advantage of a user login model requiring user authentication with a password over a secured connection and/or using operating-system-native security control and verification on communications devices, to ensure only verified, permitted human users access example methods and potentially user accounts.

Some example methods being described here, it is understood that one or more example methods may be used in combination and/or repetitively to produce multiple options and functionalities for users of communications devices. Example methods may be performed through proper computer programming or hardware configuring of networks and communications devices to receive augmented reality, origin, and limitation information and act in accordance with example methods, at any number of different processor-based devices that are communicatively connected. Similarly, example methods may be embodied on non-transitory computer-readable media that directly instruct computer processors to execute example methods and/or, through installation in memory operable in conjunction with a processor and user interface, configure general-purpose computers having the same into specific communications machines that execute example methods.

It will be appreciated by one skilled in the art that example embodiments may be varied through routine experimentation and without further inventive activity. For example, although a direct image analysis may be used to determine useable anchors in visual real-world media to be augmented, it is understood that distinct analysis and input may be used to determine augmented reality performance in auditory, video, or other perceivable media. Variations are not to be regarded as departure from the spirit and scope of the exemplary embodiments, and all such modifications as would be obvious to one skilled in the art are intended to be included within the scope of the following claims.

What is claimed is:

1. A communications device configured to preview and perform immersive content, the device comprising:
   a camera configured to record an environment surrounding the device;
   a display;
   a communications port; and
   a computer processor configured to,
      receive a plurality of pieces of immersive visual content from the communications port,
      process each of the plurality of pieces of immersive visual content each into a render node,
      simultaneously visually perform one of the pieces of immersive visual content on the display and at least one of the render nodes for a different piece of immersive visual content, wherein the immersive visual content is performed in the environment surrounding the device being recorded by the camera so as to appear as an actual physical object in the environment surrounding the device, wherein the render nodes are performed at a visual distance from the performed piece of immersive visual content in the environment,
      spatially translate the render nodes in the visual distance while performing the immersive visual content in response to user input so that the render nodes and the immersive visual content appear together in the environment surrounding the device, and
      receive a user selection from among the render nodes while performing the immersive visual content, perform a different piece of immersive visual content associated with the selected render node, and stop performing the piece of immersive visual content.

2. The device of claim 1, wherein the processing removes content from the immersive visual content to preserve a representative preview in the render node.

3. The device of claim 1, wherein the render nodes and the piece of immersive visual content are performed aligned in a same coordinate system.

4. The device of claim 3, wherein a plurality of the render nodes are displayed in a line in the visual distance from the piece of immersive visual content.

5. The device of claim 1, wherein the display includes a 2-D interface, and wherein the processor is further configured to display a simplified cell of the each of the plurality of pieces of immersive visual content on the 2-D interface.

6. The device of claim 1, wherein for each of the render nodes the computer processor is further configured to generate a simplified cell of a piece of the immersive visual content for a corresponding render node.

7. The device of claim 6, further comprising:
   a memory storing the simplified cells, wherein the computer processor is further configured to transform the simplified cells based on user input to the performed one of the pieces of immersive visual content.

8. The device of claim 1, wherein the computer processor is further configured to simultaneously perform one of the pieces of immersive visual content on the display with a first plurality of the render nodes for different pieces of immersive visual content while not displaying a second plurality of the render nodes for different pieces of immersive visual content.

9. A method of previewing and performing immersive content on a communications device having a computer processor and a camera, the method comprising:
   capture, with the camera, an environment surrounding the device;
   receive a plurality of pieces of immersive visual content at the communications device;
   process, with the computer processor, each of the plurality of pieces of immersive visual content each into a render node;
   simultaneously visually perform one of the pieces of immersive visual content on the display and at least one of the render nodes for a different piece of immersive visual content, wherein the immersive visual content is performed in the environment surrounding the device being recorded by the camera so as to appear as an actual physical object in the environment surrounding the device, wherein the render nodes are performed at a visual distance from the performed piece of immersive visual content in the environment;
   spatially translating, with the computer processor, the render nodes in the visual distance while performing the immersive visual content in response to user input so that the render nodes and the immersive visual content appear together in the environment surrounding the device;
   receiving a user selection from among the render nodes while performing the immersive visual content;
   stopping performance of the piece of immersive visual content; and
   performing, with the computer processor, a different piece of immersive visual content associated with the selected render node on the display.

10. The method of claim 9, wherein the processing removes content from the immersive visual content to preserve a representative preview in the render node.

11. The method of claim 9, wherein the render nodes and the piece of immersive visual content are performed aligned in a same coordinate system.

12. The method of claim 11, wherein a plurality of the render nodes are displayed in a line in the visual distance from the piece of immersive visual content.

13. The method of claim 9, further comprising:
  displaying a 2-D interface on the display with a simplified cell of the each of the plurality of pieces of immersive visual content.

14. The method of claim 9, further comprising:
  for each of the render nodes, generating, with the computer processor, a simplified cell of a piece of the immersive visual content for a corresponding render node.

15. The method of claim 14, further comprising:
  storing the simplified cells in a memory of the device; and
  transforming, with the computer processor, the simplified cells based on user input to the performed one of the pieces of immersive visual content.

16. The method of claim 9, further comprising:
  simultaneously performing on the display one of the pieces of immersive visual content on the display with a first plurality of the render nodes for different pieces of immersive visual content while not displaying a second plurality of the render nodes for different pieces of immersive visual content.

\* \* \* \* \*